Feb. 9, 1960 W. B. REEVES 2,924,295
METHOD AND APPARATUS FOR CONTACTING LIQUIDS AND VAPORS
Filed Dec. 8, 1953 2 Sheets-Sheet 2
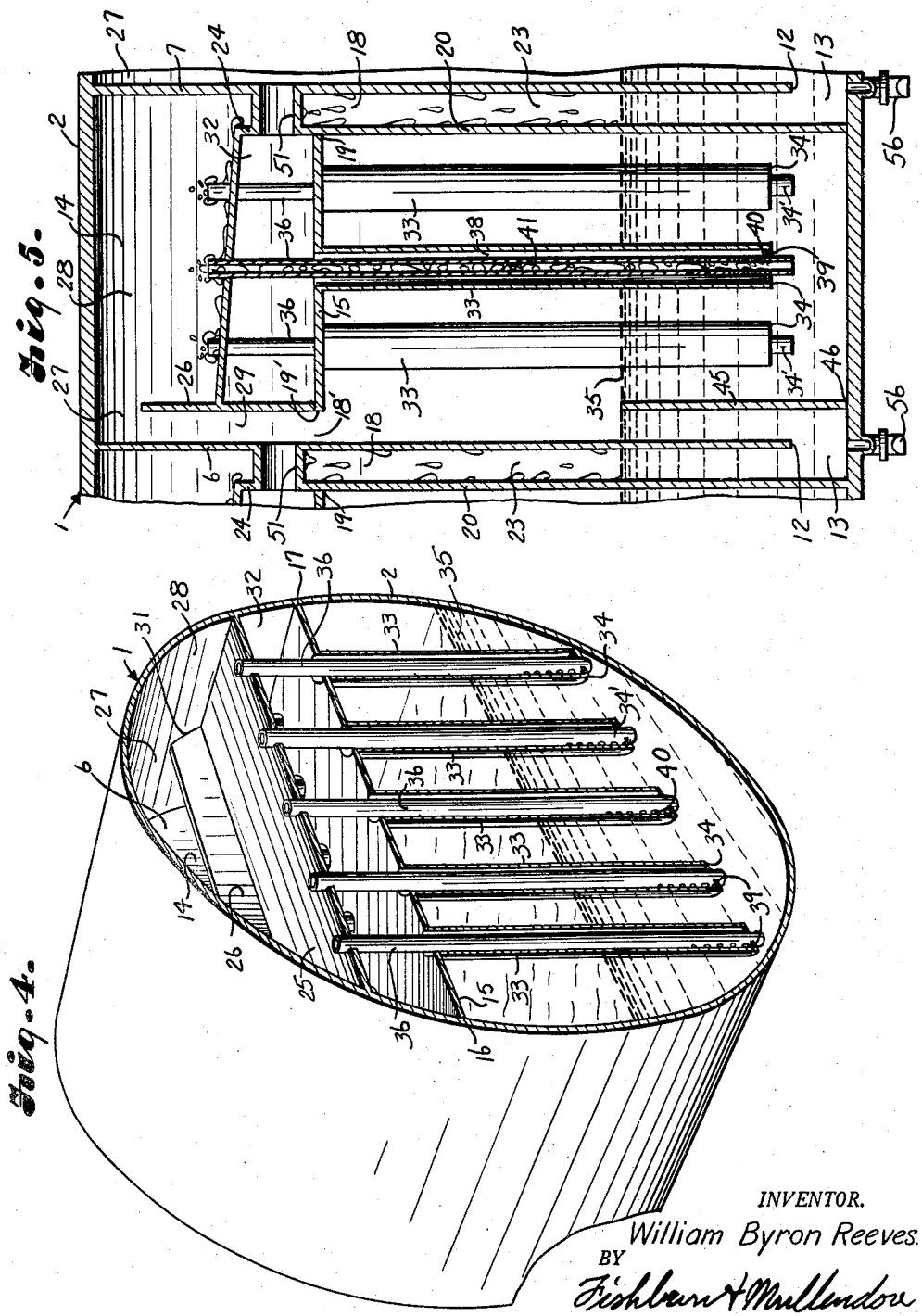
INVENTOR.
William Byron Reeves.
BY
ATTORNEYS.

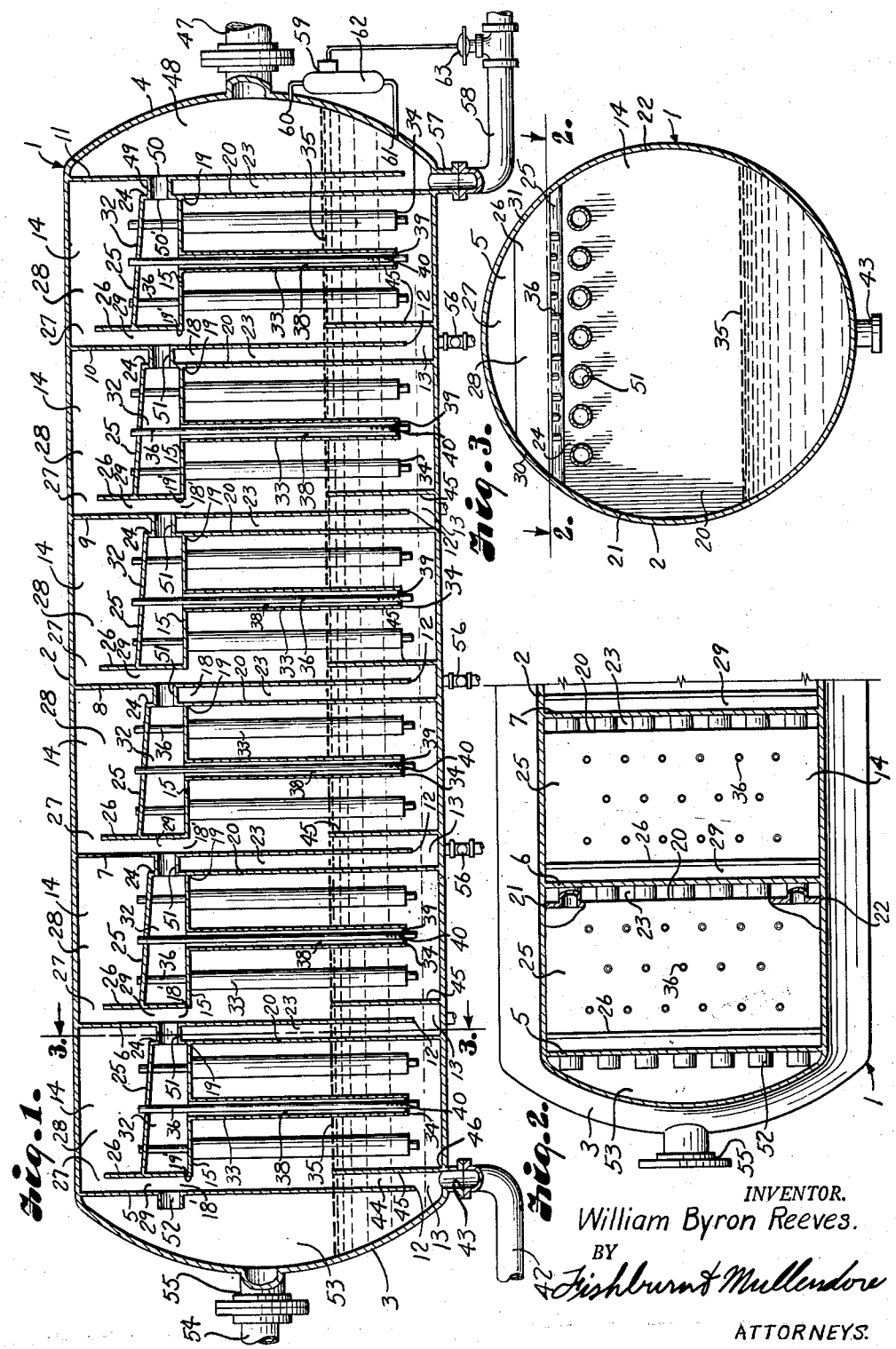

United States Patent Office 2,924,295
Patented Feb. 9, 1960

2,924,295

METHOD AND APPARATUS FOR CONTACTING LIQUIDS AND VAPORS

William Byron Reeves, Dallas, Tex., assignor to Black, Sivalls & Bryson, Inc., Kansas City, Mo., a corporation of Delaware Application December 8, 1953, Serial No. 396,941

14 Claims. (Cl. 183—8)

This invention relates to a method and apparatus for intimately contacting liquids and vapors to produce a chemical reaction or physical change with respect to either the vapor or liquid, or both vapor and liquid.

The principal object of the present invention is to provide a method and apparatus wherein the liquid capacity is directly proportional to the vapor capacity, thereby maintaining a high efficiency of contact between the respective fluids and which efficiency remains substantially the same on any variation in liquid capacity.

Other objects of the invention are to provide concurrent contact between a liquid and vapor in a horizontally disposed vessel; to provide a plurality of contact compartments arranged in horizontal sequence for the flow of the vapor and liquid in the same relative direction during the periods of contact, although the general movement of the liquid and vapor is in contraflow relatively to the length of the vessel; to provide a method and apparatus wherein the passage of the vapors through the liquid acts to pump the liquid from one contact compartment to another; to provide for such contact within tubes having perforations for admitting the vapors for mixture with the liquid and effect pumping of the liquid through the tubes; to provide a method and apparatus wherein the effective area of the perforations for the passage of vapor into the contact tubes automatically varies in direct proportion to the vapor volume flowing, thereby maintaining a more constant magnitude of the loss in pressure of the vapor stream in flowing through the apparatus throughout a wider range in vapor volume capacity; to subsequently separate the vapor and liquid phases, and to provide a more compact apparatus for obtaining a given contact time.

In accomplishing these and other objects of the invention hereinafter pointed out, I have provided an improved method and apparatus illustrated in the accompanying drawings wherein;

Fig. 1 is a longitudinal section through a contact vessel constructed in accordance with the present invention.

Fig. 2 is a horizontal section of the liquid inlet end of the vessel, the point of the section being indicated on a line 2—2 of Fig. 3.

Fig. 3 is a cross section through the vessel on the line 3—3 of Fig. 1.

Fig. 4 is an enlarged perspective section of a portion of the vessel with the section being taken through one of the contact compartments.

Fig. 5 is an enlarged section through one of the compartments and particularly illustrating the pumping action of the gas on the liquid whereby the liquid is transferred from one cell to another.

Referring more in detail to the drawings:

1 designates a vessel which preferably includes a cylindrical wall 2 and concave-convex ends 3 and 4. The vessel is arranged horizontally and has a plurality of transverse partitions 5, 6, 7, 8, 9, 10 and 11, conforming in size and shape with the cross section of the vessel and having the peripheral edges thereof connected to the inner face of the wall 2 of the vessel as by welding or the like except at the lower edges 12, which are spaced from the wall of the vessel to provide inlets 13 to compartments 14, the compartments being provided between the partitions.

Each compartment is of the same character and is divided by a horizontal plate 15 that is located parallel with the horizontal diameter of the vessel and has its ends 16 and 17 connected to the side walls thereof. The plate 15 is narrower than the compartment to provide spaces 18 and 18' between the side edges 19 and 19' thereof and the adjacent transverse partitions. Connected with the spaced edge 19 of the plate 15, and extending vertically across the entire width of the compartment is a plate 20 that has its side edges 21 and 22 connected with the wall of the vessel to form a down flow passageway 23 to the inlet 13 of a next compartment. The upper edge 24 of the plate 20 projects above the plate 15 and connects with an upper plate 25 that slopes upwardly to connect with a transverse baffle plate 26. The baffle plate 26 is spaced inwardly of the adjacent partition and has its lower edge connected with the side edge 19' of the plate 15. The upper portion of the plate 26 terminates short of the top portion of the vessel to provide a vapor outlet passageway 27 from a vapor space 28 above the inclined plate 25 to a passageway 29 between the baffle plate 26 and the adjacent portion 6. The ends 30 and 31 of the plate 26 are connected with the vessel wall. All of the connections are such as to provide seals and are formed preferably by welding.

The plates 15 and 25, upper portion of the plate 20, and the baffle plate 26 cooperate with the wall of the vessel to form a manifold chamber 32 for distributing vapors to a plurality of tubes 33 that depend from the plate 15 and have lower ends 34 submerged in the body of contact liquid 35 which is carried in the bottom of the compartment.

Depending from the upper plate 25 and extending coaxially within the tubes 33 are inner tubes 36 of smaller diameter than the inner diameter of the outer tubes 33, to provide annular down flow passageways 38 for the down flow of vapors from the manifold chamber 32. The lower ends of the annular down flow passages 38 are closed by means of rings 39 welded to lower ends 34 of the tubes 33 and the outer faces 34' of the inner tube respectively, it being preferable that the ends of the inner tubes 36 extend slightly below the outer tubes 33. The lower ends of the tubes 36 have perforations 40 above the rings 39 for passage of the vapors through the liquid in the form of bubbles 41 (Fig. 5) which move upwardly through the inner tubes 36 and carry the liquid in contact therewith to the space 38 wherein vapors and liquids separate. The liquid flows down the plate 25 and into the passageway 23 to the inlet 13 of the next chamber. The tubes 36 extend above the plate 25 to prevent the liquid from flowing back through the tubes.

The initial liquid to be treated is admitted at one end of the vessel through a pipe 42 having connection with an inlet fitting 43 that is carried by the bottom of the wall 3 of the first compartment 14. The liquid on entering the vessel moves upwardly in a pasageway 44 and overflows a wier plate 45 that extends transversely and has its lower edge 46 connected with the wall of the vessel. Each of the compartments has a wier 45 to provide a liquid seal at each inlet opening 14.

The influent vapor is admitted at the opposite end through a pipe 47 of the vessel into a space 48 that is formed between the end 4 and the adjacent partition 11 for passage through a row of ducts 49 that connect ports 50 in the partition with ports 50' in the plate 20 and which conduct the vapors into the manifold chamber 32.

The vapors released into the space 28 of each compartment are passed to the next compartment through similar ducts 51 that connect the vapor passages 27 with the next manifold chamber. Vapor emitted from contact liquid 35 joins vapor from space 28 and is passed to next compartment through passages 29 and ducts 51. The final outlet of the vapors is through openings 52 that connect the passageway 27 of the first compartment with the end space 53 for discharge through the pipe 54 that is connected with a fitting 55 in the head 3.

The liquid is initially charged to each compartment through valved fittings 56 that connect with the bottom of the vessel in registry with each liquid seal.

The final liquid is discharged from the end of the vessel opposite the liquid inlet 42 through a fitting 57 that connects with a discharge pipe 58. A liquid level is maintained with in the respective compartments by means of a float control mechanism 59 that is located exteriorly of the vessel and has upper and lower connections 60 and 61 through which a portion of the liquid flows into a float casing 62, which contains a float (not shown) operable by the rise and fall of the liquid. The float is connected with a control valve 63 that is connected into the discharge pipe 58.

Assuming that the contact apparatus is constructed and assembled as described, it may be used to produce a chemical reaction between the vapor and liquid or to produce a physical change with respect to either the vapor or liquid or both the vapor and liquid. The pipe 42 is connected with the supply of liquid and the pipe 47 is connected with the supply of vapor.

The liquid seals that are formed by the transverse vertical plates 20 and wier plates 45 are filled with contact liquid through the valve connections 56 that are located in alignment with the respective seals. The filling of the seals also establishes the bodies of contact liquids 35 in all the respective compartments with the exception of the first. However, with the flow of liquid established through the pipe 42, the contact liquid is supplied to the first compartment which also fills the seal for that compartment. Then with the vapor flowing into the vessel through the pipe 47, the vapor fills the space 48 and passes through the ducts 49 into the manifold chamber 32 of the contact compartment at that end of the vessel. The vapor passes from the chamber 32 downwardly between the outer and inner tubes 33 and 36 and displaces the liquid in the lower ends of the outer tubes until the vapor can escape through the perforations 40 and into the lower ends of the inner tubes 36. The vapor in movement up the inner tubes bubbles or percolates the liquid upwardly through the inner tubes and carries the liquid in contact therewith for discharge into the vapor releasing space 28 for that compartment. In this space, the liquid drops out and separates from the vapor. The liquid falls onto the inclined plate 25 and flows downwardly thereof into the passageway 23 of the compartment to fill the lower portion of the space 48 up to a level set by the control valve mechanism, if the control valve is required. When this level is reached, the control valve automatically opens the valve 63 to discharge the liquid from the vessel by way of the pipe 58. The vapor, after separating from the liquid, moves through the passage 27 that connects with the next contact chamber where the flow and contact of the liquid is repeated and so on in each compartment until the vapor passes from the first contact compartment into the space 53 and is discharged through the pipe 54.

It is obvious that the liquid in each contact compartment is progressively moved in counter-current flow from the first compartment to the second compartment and so on through the vessel, keeping all of the compartments or stages supplied with bodies of contact liquid. It is obvious that while the vessel is horizontally arranged, the vapor contacts the liquid in each compartment and results in con-currently mixing and bubbling of the liquid to obtain optimum contact and to pump the liquid from one contact compartment to the next so as to give the desired contact period depending upon the nature and character of the vapors and liquids employed and the purpose for which the apparatus is used.

It is obvious that the space 28 is in connection with the space immediately above the contact liquid 35 to enable any vapors emitted from the contact liquid to join with vapor from the space 28 and pass to the next compartment through the ducts 51. It is also obvious that the spaces 18′ connect the liquid and vapor separating spaces 28 with the liquid containing compartments 14 so that the pressure of the vapor in the vapor and liquid separating space acts to equalize the pressure on the surfaces of the body of liquid so that the movement of the liquid is by the stream of bubbles.

The increased area of contact existing between the liquid walls of the many small bubbles and the vapor inside, achieves a more perfect condition of equilibrium between the liquid phase and the vapor phase and enables a more efficient contact of the vapor and liquid.

The perforations in the inner tubes are preferably arranged around the circumference in rows spaced along the length of the passageways 38 with the effective area of each opening in the respective rows decreasing in size from the bottom of the tubes toward the top row of openings, thereby effecting a more equal distribution of the vapor in each tube.

From the foregoing, it is obvious that I have provided a highly effective and prolonged contact between the vapor and liquid wherein the contact is in upward flow during the pumping action of the liquid by the vapor. It is also obvious that the relative volume of liquid and vapor remain in a constantly uniform volume. That is, the liquid capacity is directly proportional to the vapor capacity.

The invention is particularly useful as a contact apparatus in the fields of petroleum, and natural gas refining and processing, and to related applications wherein the processes such as fractional distillation, gas dehydration, gas cleaning, liquid dehydration, liquid cleaning, thermo and catalytic synthesis, absorption and stripping may be accomplished.

It is obvious that my method of contacting the vapor with the liquid results in injection of the vapor so that the kinetic energy of the vapor does not oppose but enhances flow of the liquid through the various stages. It is also obvious that there will be no flow of liquid without a flow of vapor or gas, consequently the liquid flow depends directly upon the gas or vapor flow.

The basis of the present method is premised on the value of the relation between contact efficiency and phase equilibrium and to accomplish this, the apparatus employed is constructed to utilize the energy available in the gas or vapor stream and the contact passages formed are to effect contact of the maximum amount of liquid volume circulated with a maximum amount of vapor volume under flow.

While the apparatus illustrated results in counter flow of the liquid and vapors through the vessel, the flow may be made concurrent by making the connection 54 serve as the vapor inlet and the connection 47 to serve as the vapor outlet. In this case, the manifold chambers will be connected with the compartment to the left (Fig. 1), by the ducts 51 instead of at the right hand side as is illustrated. In this case the baffle plate 26 will be at the right hand side of the manifold, otherwise the connections will all be as illustrated in Fig. 1.

What I claim and desire to secure by Letters Patent is:

1. A vapor and liquid contactor including a vessel having means therein forming a lower liquid collecting space and a separate upper vapor and liquid separating space, means connected with the vessel for admitting liquid for collection in a body in said liquid collecting space, duct means having an inlet submerged in the body of collected liquid and having an outlet discharging into the vapor and liquid separating space, means surrounding said duct means and having connection with the submerged end of said duct means for conducting vapor to the duct means for bubbling the liquid within said duct means and pumping the liquid through the duct means into the vapor and liquid separating space, means for removing the vapor from said vapor and liquid separating space, and means connected with the vapor and a liquid separating space and by-passing the liquid collecting space for separately removing the separated liquid from said separating space.

2. A vapor and liquid contactor including a vessel having means therein forming a lower liquid collecting space and a separate upper vapor and liquid separating space, means connected with the vessel for admitting liquid for collection in a body in said liquid collecting space, duct means having an inlet submerged in the body of collected liquid and having an outlet discharging into the vapor and liquid separating space, the submerged portion of the duct means having perforations above said inlet, means for conducting vapor for discharge through said perforations for establishing jets of vapor through said perforations into the duct means for bubbling the liquid within said duct means and pumping the liquid through the duct means into the vapor and liquid separating space, means for removing the vapor from said vapor and liquid separating space, and means connected with the vapor and liquid separating space and by-passing the liquid collecting space for separately removing the separated liquid from said separating space.

3. A vapor and liquid contactor including a vessel having means forming a lower liquid collecting space and a separate upper vapor and liquid separating space, means for equalizing pressure in lower liquid collecting space with pressure in upper vapor and liquid separating space, means connected with the vessel for maintaining a body of liquid in said lower space, duct means having an inlet submerged in the body of collected liquid in said lower space and having an outlet into the vapor and liquid separating space, an outer duct means surrounding the first named duct means and cooperating with the inner duct means for forming a passageway having connection with said duct means to discharge vapor into liquid within said duct means for pumping the liquid to the separating space, means connected with the outer duct means for supplying the vapor to said passageway, means for removing the vapor from the vapor and liquid separating space and means connected with the liquid and vapor separating space and by-passing the liquid collecting space for separately removing the separated liquid from the vapor and liquid separating space.

4. A vapor and liquid contactor including a vessel having a compartment therein, means for maintaining a body of contact liquid in the bottom of the compartment, partition means forming a liquid and vapor separating space in the upper portion of the compartment and providing a closed manifold chamber between said spaces, outer tubes depending from the manifold chamber, inner tubes extending coaxially through said outer depending tubes, for submergence into the body of contact liquid and having upper ends discharging into the vapor and liquid separating space, means for supplying vapors to the manifold for downflow through the outer tubes for upflow through the inner tubes to make contact with the liquid and carry the liquid upwardly into the vapor separating space, and means for removing the separated liquid and vapor from the separating space.

5. A vapor and liquid contactor including a vessel having a compartment, means for maintaining a body of contact liquid in the bottom of the compartment, partition means forming a liquid and vapor separating space in the upper portion of the compartment and providing a closed manifold chamber between said spaces, inner and outer tubes depending from the manifold chamber and said inner tubes having ends extending into the body of the liquid contained in the compartment, said inner tubes extending coaxially through said outer tubes and having upper ends passing through the manifold chamber and discharging into the vapor and liquid separating space, said inner tubes having perforations therein above said lower ends, means for supplying vapors to the manifold for downflow through the outer tubes for jetting through the apertures of the inner tubes to bubble the liquid in the inner tubes and carry the bubbles upwardly into the vapor separating space, means for removing the separated vapor from the separating space, and means connected with the separating space and by-passing the body of contact liquid for removing the separated liquid from the separating space without remixture with the contact liquid.

6. A vapor and liquid contactor including a vessel having a compartment therein and provided with a liquid inlet and outlet in the lower portion of said compartment and a vapor inlet and a vapor outlet in the upper portion of the compartment, a horizontal partition connecting three sides of said compartment below the vapor inlet and outlet, a vertical partition spaced from the other side of the compartment and connected with said partition to form a down flume leading from the upper portion of said compartment to the liquid outlet, a baffle connected with the horizontal partition in spaced relation with the vapor outlet to form a pressure equalizing passage with spaces above and below said horizontal partition and extending upwardly from said horizontal partition to prevent separated liquid from flowing through said passage, a transverse partition spaced upwardly from the horizontal partition and connecting the baffle with the vertical partition to form a separating space in the top of said compartment and cooperating with the horizontal partition and connected with the vertical partition and baffle in forming a vapor manifold there between, means in the compartment cooperating with the liquid inlet for maintaining a body of liquid in the lower portion of the compartment, a duct extending across the down flume and connecting said vapor inlet with the manifold, outer tubes depending from the manifold, inner tubes extending through the manifold and having upper ends connected with the vapor space and having lower ends extending downwardly through the outer tubes into the body of liquid and having perforations in said submerged ends for passing vapor in a plurality of jets into the inner tubes for bubbling the liquid therein and effecting elevation of the bubbles into the vapor space for separation of the vapor and liquid, the liquid flowing downwardly through said flume to the outlet and the vapor flowing over the baffle and through the vapor outlet.

7. A vapor and liquid contactor including an elongated horizontal vessel, transverse vertical partitions dividing the vessel into separate compartments each having a liquid inlet at the bottom of said compartment, means associated with each inlet for maintaining a body of liquid in each compartment, a closed vapor distributing manifold extending substantially horizontal of each compartment to divide each compartment and form an upper vapor and liquid separating space, a down flume connecting the vapor and liquid separating space of each compartment with the liquid inlet of the next compartment for conveying liquid separated from the vapor and liquid separating space of one compartment to the inlet of the next compartment, inner and outer tubes depending from the vapor distributing manifolds and extending into the bodies of liquid maintained in the respective compartments and forming annular passageways therebetween in connection with the distributing manifolds for conducting vapors downwardly, said inner tubes having perforations passing the vapor from said passageways into the inner tubes for bubbling the liquid upwardly through said inner tubes responsive to flow of said vapor, and said inner tubes having upper ends connected with the vapor separating spaces for discharging the vapor and liquid mixture into said separating spaces wherein the vapors and liquids separate and the liquid flows through the down flumes to be contacted with vapors in a succeeding compartment, and means for passing the vapors from the separating space in one compartment to the manifold of the next compartment whereby the vapor and liquid are caused to flow through the compartments from one end of the vessel to the other.

8. A vapor and liquid contactor including a vessel having a compartment, means for maintaining a body of contact liquid in the bottom of a compartment, partition means forming a liquid and vapor separating space in the upper portion of the compartment and providing a closed manifold spaced from a side of the compartment to provide a connection between a vapor space in a lower portion of said compartment and said vapor and liquid separating space, tubes having upper ends discharging into the vapor and liquid separating space and having lower ends submerged in the body of liquid, tubes having upper ends connected with the interior of said manifold and depending from the manifold and having lower ends connected with lower submerged portions of said first named tubes, means for supplying vapors to the manifold for downflow through the depending tubes for bubbling the liquid in the first named tubes to carry the bubbles upwardly into the vapor and liquid separating space, and means for removing the separated liquid and vapor from the separating space.

9. The method of contacting a liquid and vapor in a series of stages maintaining a body of liquid in each stage, supplying liquid to the first stage, passing the vapor through said stages by bubbling the vapor through the liquid of each stage, transferring the liquid from the first stage through each succeeding stage solely responsive to the formation of the bubbles in the respective stages, and removing liquid from the last stage.

10. A vapor and liquid contactor including, a vessel having means therein forming a series of compartments each having a lower portion for containing a body of liquid therein and an upper vapor and liquid separating space, means for maintaining a body of liquid in the respective liquid containing spaces and for establishing a surface level to maintain said vapor spaces, flow connections between said compartments at points substantially above the surface level of the bodies of liquid, means for conducting vapor to said compartments for discharge into said bodies of liquid below said surface level to form bubbles within said liquid, conducting means extending into the bodies of liquid and having inlets at the point of formation of the bubbles and having outlets in upper portions of the vapor separating spaces to conduct streams of bubbles and vapor upwardly above the surface level of the bodies of liquids to the upper portions of the vapor separating spaces for separation of the vapor and liquid components of the streams for the separated liquid to flow through the flow connections to the next compartment.

11. A vapor and liquid contactor as described in claim 10 wherein the compartments are in horizontal series.

12. The method of contacting a vapor and liquid in a series of stages including, maintaining a body of liquid in each stage, maintaining vapor and liquid separating spaces above the bodies of liquid, discharging vapor in bubbling contact into the bodies of liquid to form bubbles, forming upwardly moving streams of said bubbles above the surface level of the respective bodies of liquid in which the bubbles are formed to prolong contact of vapor and liquid components of said streams of bubbles and to lift the liquid into the liquid separating space, separating the vapor and liquid components of said bubbles in said separating spaces, and passing the separated liquid to a succeeding stage.

13. The method of injecting a vapor into a liquid in a series of stages including, maintaining a body of liquid in each stage, passing the vapor into the liquid of each stage for forming streams of bubbles, continuing the upwardly moving streams of bubbles above the bodies of liquid to prolong contact of the vapor and gas components in said streams of bubbles, separating the vapor and liquid components of said stream of bubbles, maintaining pressure of the vapor that is separated in each stage upon the liquid of that stage whereby movement of the liquid from one stage to the next is solely by movement of said bubbles, and passing the separated vapor and liquid separately from one stage to another.

14. The method of injecting vapor into a liquid in a series of stages including, maintaining a body of liquid in each stage, injecting vapor into the bodies of liquid in said stages by bubbling the vapor through the liquid, conducting streams of said bubbles upwardly from the body of liquid to prolong contact of the vapor and liquid components of said streams, separating the liquid and vapor components, maintaining pressure of the vapor that is separated in each stage upon the liquid of that stage whereby movement of the liquid from one stage to the next is solely by movement of said bubbles, passing the liquid separated from a preceding stage to a succeeding stage, conducting the separated vapor to an adjacent stage separately from the liquid for supplying the vapor to be injected into the liquid at that stage, varying the effective vapor injection in the respective stages in proportion to the volume of vapor flowing for effecting a substantially constant magnitude of pressure drop of the vapor throughout a wider range in vapor volume capacity in the respective stages, and removing liquid from the last stage.

References Cited in the file of this patent

UNITED STATES PATENTS

| 688,776 | Greenamyer | Dec. 10, 1901 |
| 1,616,209 | Weisgerber | Feb. 1, 1927 |
| 1,741,519 | Huff | Dec. 31, 1929 |
| 2,146,566 | Daman | Feb. 7, 1939 |
| 2,223,556 | Dodds | Dec. 3, 1940 |

FOREIGN PATENTS

| 228,688 | Great Britain | Feb. 12, 1925 |
| 928,201 | France | Nov. 11, 1947 |